United States Patent [19]
Kuroda

[11] Patent Number: 5,093,745
[45] Date of Patent: * Mar. 3, 1992

[54] LIGHT BEAM SCANNING OPTICAL SYSTEM

[75] Inventor: Muneo Kuroda, Osaka, Japan

[73] Assignee: Minolta Camera Kabushiki Kaisha, Osaka, Japan

[*] Notice: The portion of the term of this patent subsequent to Jan. 15, 2008 has been disclaimed.

[21] Appl. No.: 561,918

[22] Filed: Aug. 1, 1990

[30] Foreign Application Priority Data

Aug. 2, 1989 [JP] Japan .................. 1-201547

[51] Int. Cl.$^5$ .............................. G02B 26/08
[52] U.S. Cl. ......................... 359/217; 250/235
[58] Field of Search ............. 350/6.8, 6.7; 250/235, 250/236; 364/523; 346/108

[56] References Cited

U.S. PATENT DOCUMENTS

| | | |
|---|---|---|
| 3,469,030 | 9/1969 | Priebe . |
| 3,750,189 | 7/1973 | Fleischer . |
| 3,946,150 | 3/1976 | Grafton . |
| 4,520,370 | 5/1985 | Fujii et al. . |
| 4,704,698 | 11/1987 | Reiniger ............ 364/523 |
| 4,759,593 | 7/1988 | Kessler ............. 359/217 |
| 4,847,492 | 7/1989 | Houki .............. 250/235 |
| 4,848,864 | 7/1989 | Ostertag et al. ...... 359/217 |
| 4,984,858 | 1/1991 | Kuroda ............. 359/217 |

FOREIGN PATENT DOCUMENTS

| | | |
|---|---|---|
| WO8203924 | 11/1982 | European Pat. Off. . |
| 3644124 | 11/1988 | Fed. Rep. of Germany . |
| 54-123040 | 9/1979 | Japan . |
| 55-36127 | 9/1980 | Japan . |
| 61-173212 | 8/1986 | Japan . |

*Primary Examiner*—Loha Ben
*Attorney, Agent, or Firm*—Price, Gess & Ubell

[57] ABSTRACT

In a light beam scanning optical system, a toroidal lens and a spherical mirror or a cylindrical mirror function in cooperation to rectify the scanning speed of a light beam deflected at an equiangular velocity by a rotative deflection device to be uniform over the range from the center to both edges of scanning area in the main scanning direction. The toroidal lens is further arranged to maintain each reflective facet of the rotative deflection device and the light collecting surface in the conjugate relation, thereby rectifying an error of image inclination of each reflective facet and at the same time regulating the direction of emission of the light beam so as to lessen the curvature of the field.

10 Claims, 6 Drawing Sheets

LIGHT BEAM SCANNING OPTICAL SYSTEM

BACKGROUND OF THE INVENTION

1. Technical Field of the Invention

The present invention relates to a light beam scanning optical system, and more particularly to a structure of a light beam scanning optical system incorporated in laser beam printers, facsimiles and the like for scanning a beam receiving surface with a light beam.

2. Description of Related Art

Generally, a light beam scanning optical system is utilized in laser beam printers and facsimiles. A light beam scanning optical system basically comprises a semiconductor laser as a light source, a deflecting means such as a polygon mirror, and an fθ lens. The deflecting means is utilized for deflecting a luminous flux emitted from the semiconductor laser at an equiangular velocity, whereby a spot of the luminous flux moves on a light receiving surface in a main scanning direction. With the equiangular velocity, a difference in a scanning speed occurs over a range from a central portion to both edges in the main scanning direction because the light receiving surface is flat. A fθ lens is therefore provided for rectifying the difference in the scanning speed.

Since the fθ lens must be made by combining various concave lenses convex lenses and, lens planning is extremely complicated. Because of the number of lens surfaces to be ground, manufacturing process of the fθ lens requires higher accuracy and higher cost. Moreover, the fθ lens has a problem in that various lenses of the fθ lens must be made of a limited material which possesses good permeability.

In order to eliminate these disadvantages, in place of the fθ lens, the use of an elliptical mirror (Japanese Published Unexamined Patent Application No. 123040/1979), the use of a parabolic mirror (Japanese Patent Publication No. 36127/1980) and the use of a concave reflector (Japanese Published Unexamined Application No., 173212/1986) have heretofore been proposed. However, there are difficulties in manufacturing the elliptical mirror and parabolic mirror with further difficulty in obtaining high manufacturing accurancy.

SUMMARY OF THE INVENTION

The main object of the present invention is to provide an inexpensive and compact light beam scanning optical system by adopting a scanning speed correcting means which can be readily manufactured and capable of improving manufacturing accuracy in place of expensive and limited availability of fθ lens, a parabolic mirror and the like which heretofore have been proposed.

Another object of the present invention is to provide a compact light beam scanning optical system capable of lessening the curvature of the field by a luminous flux in the section perpendicular to the main scanning direction and rectifying a deviation of a scanning line, in a sub-scanning direction perpendicular to the main scanning direction, caused by inclination of a rotational axis of a polygon mirror.

These and other objects and features of the present invention will become more apparent from the following description taken in conjunction with the accompanying drawings which illustrate specific embodiments of the invention.

BRIEF DESCRIPTION OF THE DRAWINGS

It is to be noted that like members and portions are designated by like numerals, and repeated descriptions are omitted.

DESCRIPTION OF PREFERRED EMBODIMENTS

Some of the embodiments of the present invention will now be described with reference to the accompanying drawings.

A first embodiment of the present invention will be described in the following description with reference to FIGS. 1 to 5.

Figure 1:
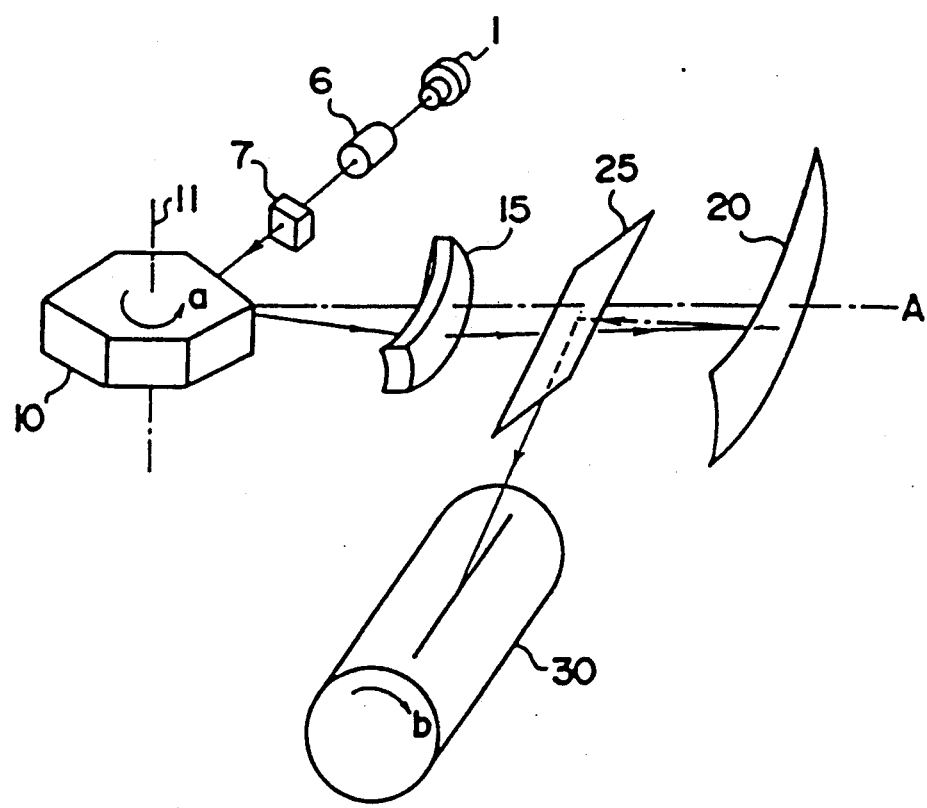
FIG. 1 is a perspective view showing the schematic structure of a first embodiment of the present invention.

FIG. 1 is a view showing the schematic structure of the first embodiment of the present invention.

In FIG. 1, numeral 1 designates a semiconductor laser. The semiconductor laser 1 is intensely modulated by an unillustrated control circuit and radiates a luminous flux provided with image information. The emitted luminous flux is rectified to a convergent luminous flux by passing through a collimator lens 6. The convergent luminous flux further converges in the direction of beam scanning by passing through a cylindrical lens 7. In concrete, the luminous flux which has passed through the cylindrical lens 7 thus converges on a straight line facing the direction of rotation of the polygonal mirror 10 at the vicinity of reflective facet of the polygonal mirror 10.

The polygonal mirror 10 is rotatively driven by an unillustrated motor at a constant speed in the direction of an arrow a, centering on a rotational axis 11. Accordingly, the convergent luminous flux emitted from the cylindrical lens 7 is successively reflected by the facets of the polygonal mirror 10 and is deflected at an equiangular velocity. The luminous flux, after deflection, passes through a toroidal lens 15, and is then reflected on the side of concave surface of a spherical mirror 20, which is further reflected by a reflecting mirror 25 and is collected onto the surface of photoconductor 30. The spot of the collected luminous flux moves at a uniform velocity in the axial direction of the photoconductor 30 according to the rotation of the polygon mirror 10. This scanning is called main scanning. While, the photoconductor 30 is rotatively driven at a constant speed in the direction of arrow b, and the scanning by this rotation of the photoconductor 30 is called sub-scanning.

In such a light beam scanning optical system, an image (an electrostatic latent image) is formed on the surface of photoconductor 30 by intense modulation of the luminous flux with the main and sub-scanning. And, in place of the conventional fθ lens, the toroidal lens 15 and the spherical mirror 20 rectify the scanning speed to be uniform over the range from the center to both edges of scanning area in the main scanning direction.

The toroidal lens 15 disposed in the light path between the polygonal mirror 10 and the spherical mirror 20 rectifies any inclination of the rotational axis of the polygonal mirror 10 and at the same time lessens curvature of the field. In other words, the luminous flux is rectified in the direction perpendicular to the main scanning direction in the vicinity of a light collecting point.

If there occurs a tilt error on each reflective facet of the polygonal mirror 10, a scanning line on the photoconductor 30 deviates in the direction of sub-scanning an irregular pitch is produced on an image. The tilt error can be rectified by setting each reflective facet of the polygonal mirror 10 and the light collecting surface of the photoconductor 30 in a conjugate relation in the section perpendicular to the main scanning direction. In this embodiment, a luminous flux is collected onto the polygonal mirror 10 by the cylindrical lens 7, while each reflective facet of the polygonal mirror 10 and the surface of the photoconductor 30 are arranged to maintain the conjugate relation by the toroidal lens 15 and the spherical mirror 20.

In this embodiment, it is further arranged to rectify an emitting luminous flux to a convergent luminous flux by the collimator lens 6 so that the curvature of the field in the vicinity of the photoconductor 30 can be rectified. In other words, when a convergent or a divergent luminous flux enters the polygonal mirror 10 (the same as those of other rotative deflection devices), the light collecting point after reflection becomes almost a circular arc centering on the point of reflection and produces a curvature of the field, assuming that no optical member is provided behind the polygonal mirror 10. When a convergent luminous flux enters the polygonal mirror 10, the curvature of the field becomes concaved in the direction of incident light. The distance between the spherical mirror 20 and the image plane is changed according to the state of convergence of incident light. The curvature of the field is changed by variation of the distance between the mirror 20 and the image plane. Practically, the curvature of the field made by the concave plane of the spherical mirror 20 is rectified by the curvature of the field made by the convergent luminous flux to result in making the curvature of the field at the light collecting surface smaller and the level of the image plane is improved.

In this regard, the toroidal lens 15 is also provided with the same function to lessen the curvature of the field. When the curvature of the field becomes smaller, the variation in the diameter of convergent luminous flux caused by the difference in scanning position (image height) becomes smaller, and optical system can be utilized in wider angles and image can be more densely produced since the diameter of convergent luminous flux can be made smaller.

Figure 2:
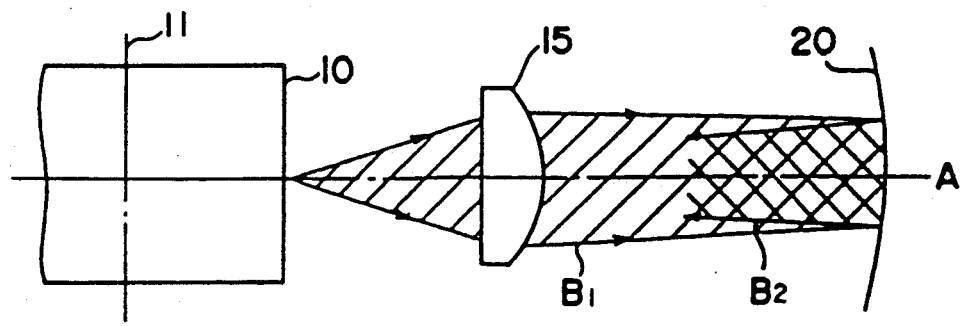
FIGS. 2 to 4 are views schematically illustrating light path as an example given for consideration of shapes of light path.

It is further arranged that the light beam impinges on the polygonal mirror 10 at an angle other than 90 degrees with respect to the rotational axis 11 of the polygonal mirror 10. In addition, incident light on the spherical mirror 20 and reflected light from the spherical mirror 20 are spaced apart. As a result, reflected light from the spherical mirror 20 can be easily deflected to the photoconductor 30 by the reflecting mirror 25. This will be described in the following with reference to FIG. 2. FIG. 2 shows a section perpendicular to the main scanning direction in which the rotational axis 11 of the polygonal mirror 10 are perpendicular to unillustrated incident luminous flux on the polygonal mirror 10. A luminous flux reflected by the polygonal mirror 10 passes through the toroidal lens 15 to become an incident luminous flux $B_1$ entering the spherical mirror 20, and is reflected by the spherical mirror 20. The reflected luminous flux $B_2$ and the incident luminous flux $B_1$ are one over the other in the section of FIG. 2. Therefore, it is difficult to introduce the reflected luminous flux $B_2$ to the photoconductor 30.

Figure 3:
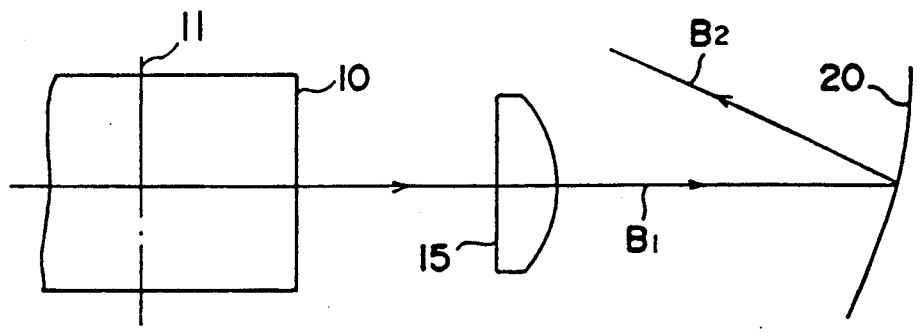

In order to eliminate this disadvantage, it is proposed to incline the spherical mirror 20. By inclining the spherical mirror 20 as shown in FIG. 3, the incident luminous flux $B_1$ and the reflected luminous flux $B_2$ can be spaced apart.

Figure 4:
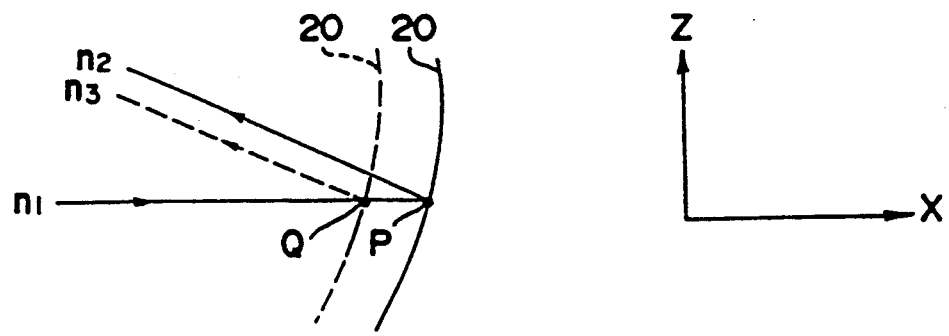

However, when the spherical mirror 20 is inclined, there occurs a curve on a scanning line, the cause of which will now be described with reference to FIG. 4. In the figure, an optical axis in the plane perpendicular to the main scanning direction is shown, and the point P shows a reflection point of the main beam of light when angle of deflection is 0°, while the point Q shows a reflection point of the main beam of light when angle of deflection is θ. The spherical mirror 20 has a curvature in the deflection plane, and therefore, reflection point is shifted in the direction of axis X when the angle of deflection changes from 0° to θ. Further, the reflection light n3 at angle of deflection θ against the incident light n1 is shifted in the direction of axis Z against the reflection light n2 at angle of deflection 0°. The shifted amount varies according to angle of deflection θ, and the reflection light n2 and n3 are not contained in the same plane. The scanning line is, therefore, curved in the direction of axis Z in the plane perpendicular to the optical axis.

Figure 5:
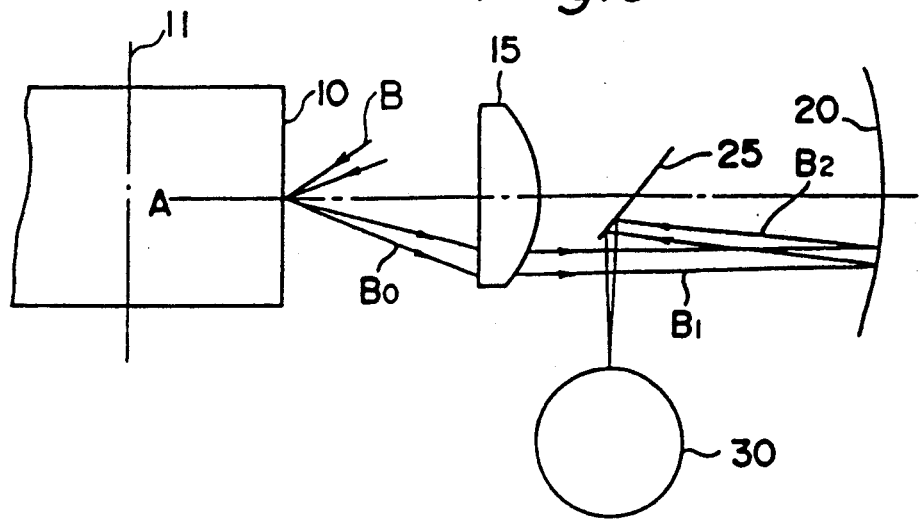
FIG. 5 is a view illustrating light path of the first embodiment.

Therefore, in this embodiment, as shown in FIG. 5, it is arranged that the rotational axis 11 of the polygonal mirror 10 is not perpendicular to incident luminous flux B on the polygonal mirror 10. At this time, the reflection luminous flux $B_0$ from the polygonal mirror 10 also is not perpendicular to the rotational axis. The reflection luminous flux $B_0$ passes through the lower portion of the toroidal lens 15 and reflected by the spherical mirror 20. The incident luminous flux $B_1$ on the spherical mirror 20 and the reflection luminous flux $B_2$ from the spherical mirror 10 are spaced apart from the optical axis A (a straight line connecting the vertex of the toroidal lens 15 and the vertex of the spherical mirror 20 being referred to as the optical axis) and therefore the luminous fluxes $B_1$ and $B_2$ are spaced apart from each other. Consequently, the reflection luminous flux $B_2$ can be easily introduced to the photoconductor 30 by the reflecting mirror 25. By adopting such an arrangement, the scanning line can be prevented from being curved, because it is the same as the case that only the lower parts of the luminous fluxes $B_1$, $B_2$ are used in FIG. 2.

Figure 6:
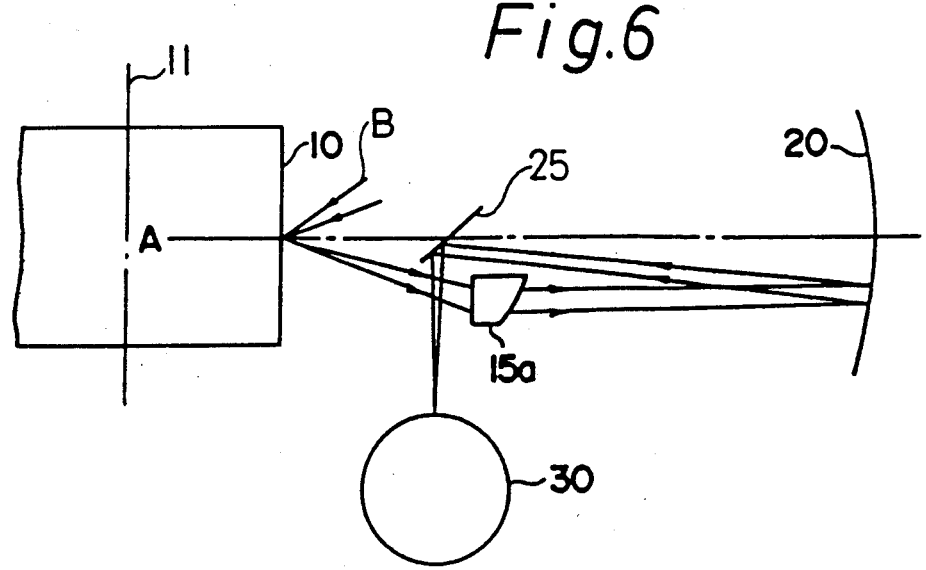
FIG. 6 is a view illustrating light path of a second embodiment of the present invention.
Figure 7:
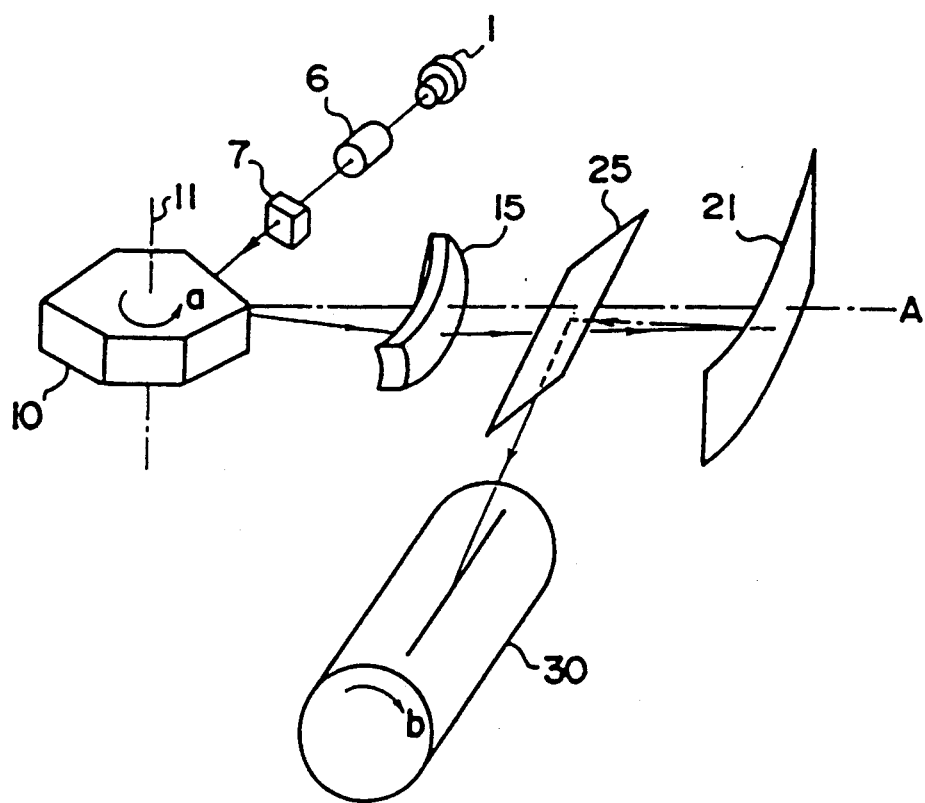
FIG. 7 is a perspective view showing the schematic structure of a third embodiment of the present invention.
Figure 8:
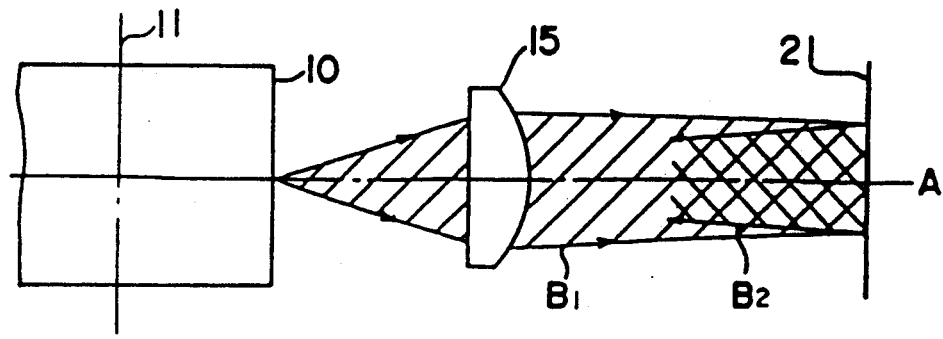
FIGS. 8 to 10 are views illustrating light path as an example given for consideration of shapes of light path.
Figure 9:
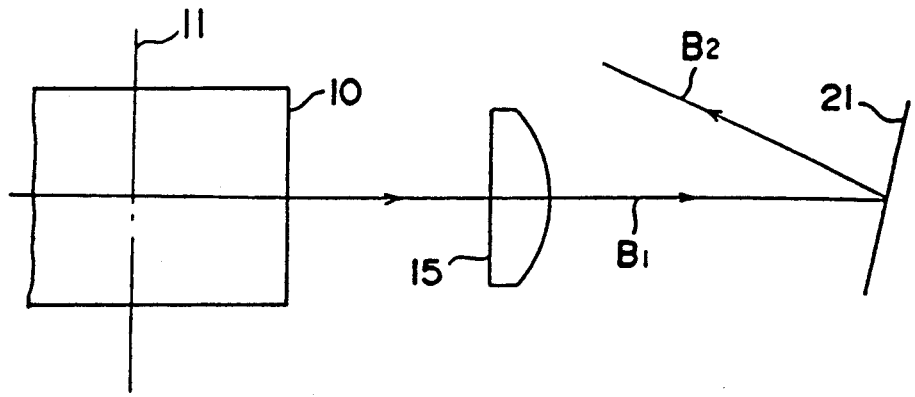
Figure 10:
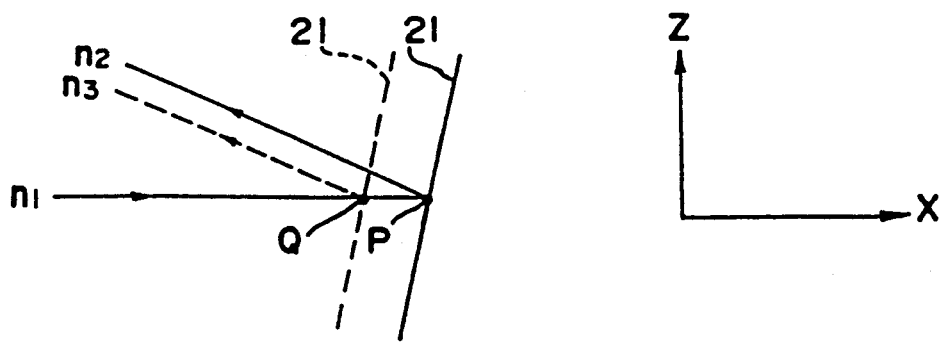
Figure 11:
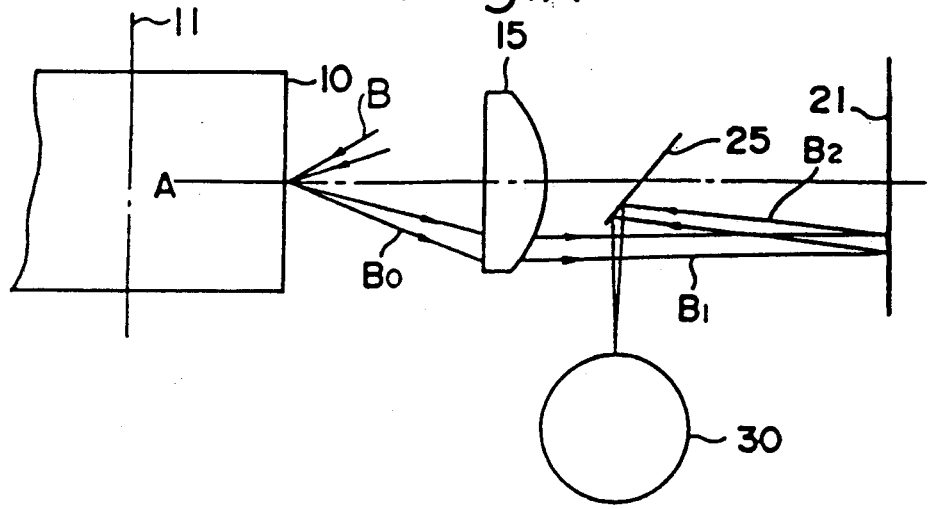
FIG. 11 is a view illustrating a light path of the third embodiment.

Now, a second embodiment of the present invention will be described with reference to FIG. 6. In this embodiment, as shown in FIG. 6, a toroidal lens 15a with unnecessary portions cut away is used and at the same time a turn back reflecting mirror 25 is provided between the polygonal mirror 10 and a toroidal lens 15a. With this arrangement, it is possible to set the distance from the spherical mirror 20 to the reflecting mirror 25 at a long position and set the distance from the reflecting mirror 25 to the photoconductor 30 at a short position. Accordingly, respective members can be arranged more freely and at the same time the optical system can be made compact. Further, it is economical since two toroidal lenses 15a can be obtained from one toroidal lens 15 of the first embodiment.

Now, a third embodiment of the present invention will be described in the following with reference to FIGS. 7 to 11. In this embodiment, the spherical mirror 20 of the first embodiment shown in FIGS. 1 to 5 is replaced by a cylindrical mirror 21. The cylindrical mirror 21 has the same curvature with that of the spherical mirror 20 in the deflection plane by the polygon mirror 10, and at the same time has functions of correcting the scanning speed, and surely improving the curvature characteristic of the light collecting plane and the level of the image plane.

FIGS. 7 to 11 correspond to FIGS. 1 to 5, and the cylindrical mirror 21 has all the abovedescribed functions of the spherical mirror 20. Therefore, further description thereof will be omitted.

Figure 12:
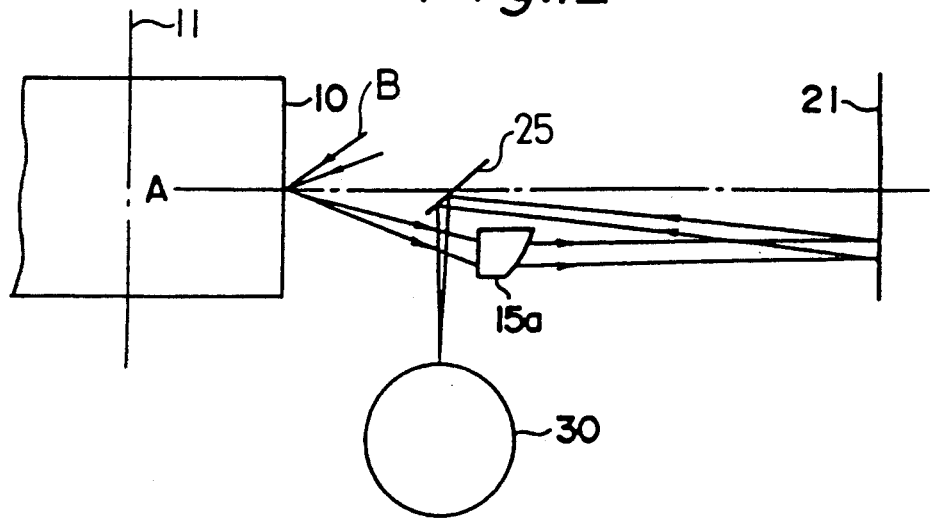
FIG. 12 is a view illustrating a light path of a fourth embodiment of the present invention.

Now, a fourth embodiment of the present invention will be described in the following with reference to FIG. 12.

This embodiment is the same as the optical system of the third embodiment in which a cylindrical mirror 21 is utilized except that a toroidal lens 15a with unnecessary portions thereof cut away is utilized and the reflecting mirror 25 is provided between the polygon mirror 10 and the toroidal lens 15a similarly to the second embodiment.

The light beam scanning optical system related to the present invention is not limited to each of the embodiments above, and various changes and modifications within the scope of the principles may be employed.

For instance, the polygonal mirror 10 utilized in the embodiments as a deflection device may be replaced by various other means if it is capable of deflecting a luminous flux at an equiangular velocity on a plane. Beside the semiconductor laser, other laser emitting means or a spot light source may be utilized as a light source.

Further, in the abovementioned embodiments, a luminous flux emitted from the semiconductor laser is rectified to a convergent luminous flux by passing through a collimator lens. However, the emitted luminous flux may be rectified only to a substantially parallel luminous flux.

Although the present invention has been fully described by way of examples with reference to the accompanying drawings, it is to be noted that various changes and modifications will be apparent to those skilled in the art, Therefore, unless otherwise such changes and modifications depart from the scope of the present invention, they should be construed as being included therein.

What is claimed is:

1. A light beam scanning optical system comprising:
   emitting means for emitting a light beam;
   converging means for converging the light beam emitted from said emitting means into a straight line in a direction parallel to a beam scanning direction;
   a deflection device disposed in the vicinity where the light beam is converged into said straight line, said deflection device being rotatable about a rotational axis thereof for deflecting the light beam at an equiangular velocity;
   a spherical mirror which receives and reflects the light beam having been deflected from said deflection device; and
   a toroidal lens disposed between the deflection device and the spherical mirror in optical alignment therewith,
   wherein the light beam impinges onto said deflection device at an angle other than 90 degrees with respect to the rotational axis of the deflection device.

2. A light beam scanning optical system as claimed in claim 1, wherein said deflection device comprises a polygonal mirror.

3. A light beam scanning optical system as claimed in claim 1, further comprising a plane mirror which receives and reflects the light beam having been reflected from said spherical mirror to a beam receiving plane.

4. A light beam scanning optical system as claimed in claim 3, wherein said plane mirror is positioned between the toroidal lens and the spherical mirror.

5. A light beam scanning optical system as claimed in claim 3, wherein said plane mirror is positioned between the deflection device and the toroidal lens.

6. A light beam scanning optical system comprising:
   emitting means for emitting a light beam;
   converging means for converging the light beam emitted from said emitting means into a straight line in a direction parallel to a beam scanning direction;
   a deflection device disposed in the vicinity where the light beam is converged into said straight line, said deflection device being rotatable about a rotational axis thereof for deflecting the light beam at an equiangular velocity;
   a cylindrical mirror which receives and reflects the light beam having been deflected from said deflection device; and
   a toroidal lens disposed between the deflection device and the cylindrical mirror in optical alignment therewith,
   wherein the light beam impinges onto said deflection device at an angle other than 90 degrees with respect to the rotational axis of the deflection device.

7. A light beam scanning optical system as claimed in claim 6, wherein said deflection device comprises a polygonal mirror.

8. A light beam scanning optical system as claimed in claim 6, further comprising a plane mirror which receives and reflects the light beam having been reflected from said cylindrical mirror to a beam receiving plane.

9. A light beam scanning optical system as claimed in claim 8, wherein said plane mirror is positioned between the toroidal lens and the cylindrical mirror.

10. A light beam scanning optical system as claimed in claim 8, wherein said plane mirror is positioned between the deflection device and the toroidal lens.

* * * * *